United States Patent
Grayson

(10) Patent No.: US 7,657,262 B2
(45) Date of Patent: Feb. 2, 2010

(54) SYSTEM AND METHOD FOR PROVIDING ENHANCED HANDOVER PERFORMANCE

(75) Inventor: Mark Grayson, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 969 days.

(21) Appl. No.: 11/136,686

(22) Filed: May 24, 2005

(65) Prior Publication Data

US 2006/0270411 A1 Nov. 30, 2006

(51) Int. Cl.
*H04W 36/00* (2006.01)
(52) U.S. Cl. .................. 455/444; 455/436; 455/442; 455/552.1; 370/311
(58) Field of Classification Search .............. 455/444, 455/436, 442, 552.1; 370/331
See application file for complete search history.

(56) References Cited

U.S. PATENT DOCUMENTS 7,394,788 B2 * 7/2008 Kim et al. .................. 370/331

OTHER PUBLICATIONS

Alcatel, BT PLC, Cingular Wireless LLC, Ericsson AB, Kineto Wireless Inc., Motorola, Inc., Nokia, Nortel, O2, Research In Motion Limited, Rogers Wireless Inc., Siemens AG, Sony Ericsson, T-Mobile USA, "UMA Architecture (Stage 2) R1.0.4 (May 2, 2005), Technical Specification—Unlicensed Mobile Access (UMA); Architecture (Stage 2)," pp. 1-87, 2004-2005.

* cited by examiner

*Primary Examiner*—Nghi H Ly
(74) *Attorney, Agent, or Firm*—Baker Botts L.L.P.

(57) ABSTRACT

A method for assisting in a handover is provided that includes utilizing a link between a centralized access controller (CAC) and customer premises equipment (CPE) to facilitate a communication session involving a mobile station. The method also includes rejecting a handover from a public network to a cell controlled by the CAC after recognizing, in advance, that sufficient resources are unavailable for supporting a channel to be employed for the handover.

35 Claims, 3 Drawing Sheets

SYSTEM AND METHOD FOR PROVIDING ENHANCED HANDOVER PERFORMANCE

TECHNICAL FIELD OF THE INVENTION

This invention relates generally to communications and, more particularly, to a system and a method for providing enhanced handover performance.

BACKGROUND OF THE INVENTION

Unlicensed mobile access (UMA) technology provides access to global system for mobile (GSM) and general packet radio service (GPRS) mobile services over unlicensed spectrum technologies (e.g. Bluetooth, 802.11, etc.). By deploying UMA technology, service providers can enable subscribers to roam and to perform a handover between cellular networks and public and private unlicensed wireless networks using dual-mode mobile handsets. With UMA, subscribers receive a consistent user experience for their mobile voice and data services as they transition between networks.

Thus, UMA is a technology for delivering seamless mobility between GSM and wireless local area network (WLAN) access. GSM media and signaling can be tunneled over a broadband Internet protocol (IP) network. This allows converged circuit and packet services to be delivered to a converged terminal. For example, a user with a dual mode GSM UMA handset is able to receive GSM service (voice/short message service (SMS)/GPRS) when in a home environment without using the GSM radio network.

Key to the successful operation of a dual mode solution typified by UMA is the successful handover between a cell corresponding to the un-licensed mobile technology (Bluetooth, 802.11, etc) and a cell corresponding to the licensed frequencies of the public land mobile network (PLMN). A handover to a cell corresponding to unlicensed technology is generally requested by the client, e.g., based on received WLAN signal strength. Further, a trigger to handover from an unlicensed cell to a cell of a PLMN may be generated by the client, e.g., based on received WLAN signal strength, or by the network, e.g., based on metrics derived from the up-link packets. In a dual mode environment, such a handover process is fraught with additional problems and deficiencies compared to the pure cellular handover procedure. Augmenting, optimizing, or enhancing this dual mode handover process presents a significant obstacle for network operators, system designers, and component manufacturers.

SUMMARY OF THE INVENTION

From the foregoing, it may be appreciated by those skilled in the art that a need has arisen for an improved dual mode handover process that provides an effective solution for participants in a communications architecture. In accordance with an embodiment of the present invention, a system and a method for initiating and establishing an optimal handover substantially eliminate or greatly reduce disadvantages and problems associated with conventional communication strategies and protocols.

In one embodiment, a method for assisting in a handover is provided that includes utilizing a link between a centralized access controller (CAC) and customer premises equipment (CPE) to facilitate a communication session involving a mobile station. The method also includes rejecting a handover from a public network to a cell controlled by the CAC after recognizing, in advance, that sufficient resources are unavailable for supporting a channel to be employed for the handover.

In more specific embodiments, the handover from the CAC to the public network can be triggered by poor downlink quality without leveraging algorithms associated with the mobile station. Channel modification requests for enhanced service may be rejected by the CAC because information provided by the CPE indicates that such an enhancement will lead to a deterioration in quality for the communication session.

In still other embodiments, a configuration server is provided that is coupled to the CPE and operable to facilitate the handover. In addition, a mobile wireless gateway is provided and operable to facilitate the handover. Note that if a signaling link between the CAC and the CPE indicates that the handover will likely fail, then the CAC is operable to reply to a handover request with a handover reject message. The handover reject message ensures that the mobile station does not suffer degraded call quality due to a handover failure.

Certain embodiments of the present invention may provide a number of technical advantages. For example, according to one embodiment of the present invention, an architecture and a process are provided that offer a better hand-in performance from public land mobile network (PLMN) to a cell corresponding to un-licensed technology, which results in less dropped calls. In addition, such an architecture provides for better hand-out performance from a cell corresponding to unlicensed technology to PLMN, as there is no reliance on uncontrolled handset algorithms, and no reliance on media gateway quality of service (QoS) event packages. Specific embodiments of the present invention may also offer better handling of channel modification requests, which also yields enhanced performance.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
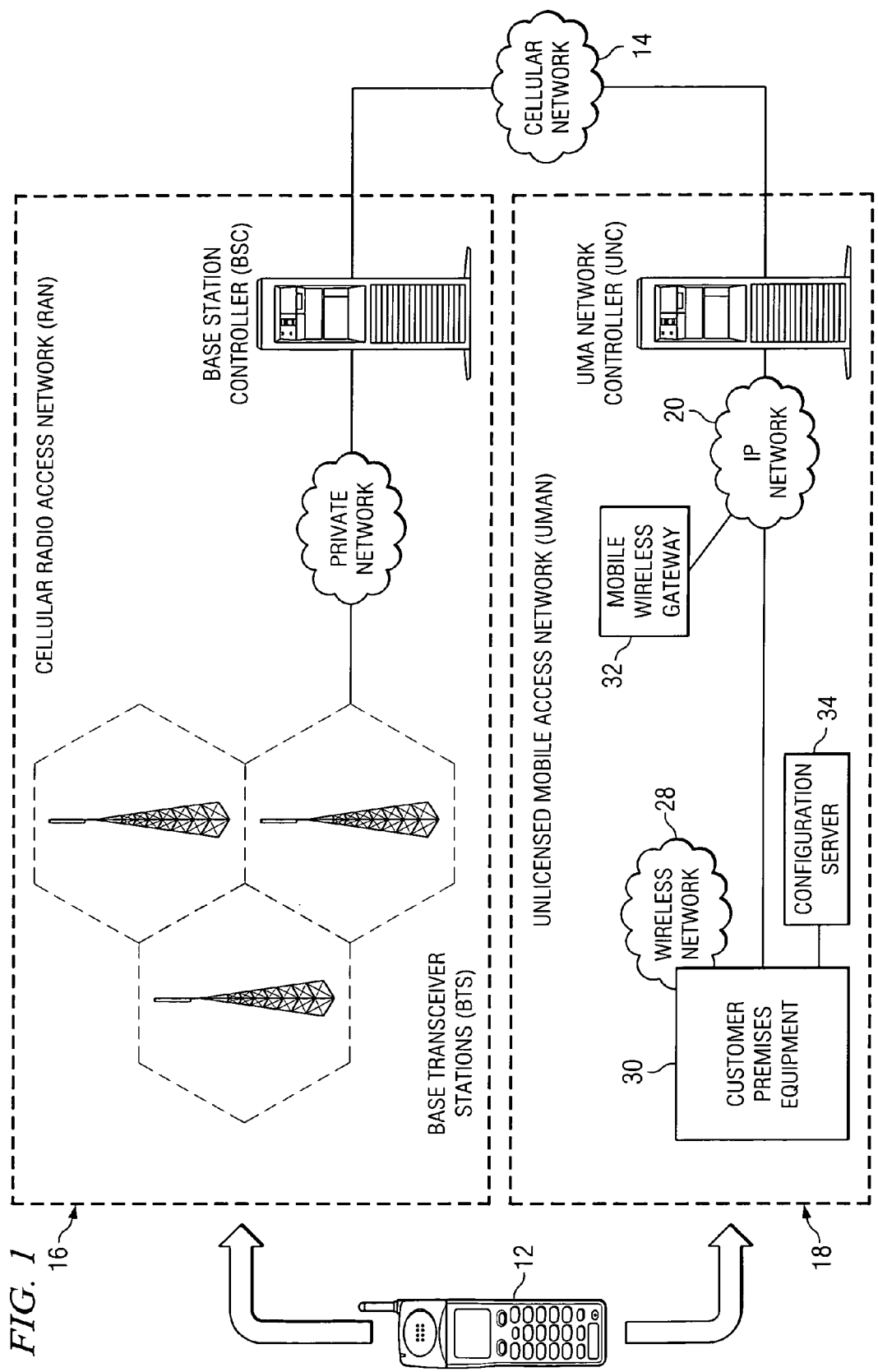
FIG. 1 is a simplified block diagram illustrating an example unlicensed mobile access network for implementing one embodiment of the present invention.

FIG. 1 is a simplified block diagram of a communication system 10 for communicating, receiving, and transmitting data in a communications environment. Communication system 10 includes a mobile station 12, a cellular network 14, a cellular radio access network (RAN) 16, and an unlicensed mobile access network (UMAN) 18. UMAN 18 may include an Internet protocol (IP) network 20, a UMA network controller (UNC), and a wireless network 28. Communication system 10 may also include a residential customer premises equipment (CPE) element 30. A mobile wireless gateway (MWG) 32 may be coupled to IP network 20. The UMA UNC knows how to poll configuration server 34 prior to initiating the handover process, as explained more fully below. In certain embodiments, CPE element 30 generally provides a digital subscriber line (DSL) modem, a residential routing gateway, and an 802.11 access point. In addition, CPE element 30 may be coupled to a configuration server 34.

In accordance with the teachings of the present invention, communication system 10 offers a new mechanism for leveraging unlicensed mobile access (UMA) technology, which is operable to deliver seamless mobility between global system for mobile (GSM) and wireless local area network (WLAN) access. This allows a user with a dual mode GSM UMA handset is able to receive GSM service when in a home environment without using the GSM radio network.

The beneficial operations of UMA are predicated on successful handovers between the UMA cell and the public land mobile network (PLMN). A handover to a UMA cell is generally requested by the UMA client and is sometimes initiated based on received WLAN signal strength. A handover from a UMA cell to the PLMN is triggered by either the network or the client. UMA defines a technique by which the network can indicate to the UMA client that a handover is required.

Because the network is unaware of any quality issues relating to the down-link performance, this trigger is specific to an up-link triggered handover. Similar procedures are defined in the UMA client to trigger handover from a UMA cell to the PLMN due to down-link quality issues.

Missing from any such arrangement are algorithms (defined in UMA) that address: 1) when a UMA handset should trigger the handover from a PLMN to a UMA cell; 2) when a handset should trigger handover from UMA to the PLMN; and 3) when the UMA network should trigger handover from UMA to the PLMN. This may result in a disparity of performance between different handsets and an increasing probability of handover failure when transitioning between UMA and the PLMN.

Communication system 10 addresses this issue (and others) by providing an enhancement to the handover decision criterion. This enhancement is achieved by having an additional communication between the UMA network and the CPE in the consumer's premise, which is providing UMA service.

Note that GSM uses radio access specific techniques for handover. These include measurement reporting and quality reporting made on the down-link the serving cell. The GSM RAN is able to derive level and quality information from the serving up-link. The reporting of neighboring cells allows the network to trigger handover.

The invention addresses the initial hand-over from the GSM edge RAN (GERAN) to UMA. Because the UMA handset (i.e. mobile station 12) is not fully transmitting on the UMA network prior to handover, it can only base the handover decision on signal strength. If the UMA network is suffering congestion, the handover will likely fail.

The handover performance of PLMN to UMA and from UMA to PLMN is enhanced by using a proprietary link between the UNC and a residential gateway. Handover from the PLMN to UMA cell can be rejected because the UMA controller knows in advance that sufficient wide area network (WAN) or WLAN resources or CPE 30 processing resources are unavailable for supporting the circuit switched (CS) or packet switched (PS) channel. Handover from UMA to the PLMN can be triggered by poor downlink quality without the necessary assistance of handset algorithms. Handover from UMA to PLMN can be triggered without the necessary assistance of the MGW quality event package support or specific procedures in the UNC. Channel modification requests for enhanced service may be rejected by the UMA controller because information provided by the residential gateway indicates that such an enhancement will lead to a deterioration in quality.

By leveraging the enhancements provided in mobile station 12 and/or infrastructure in UMAN 18, communication system 10 offers a new protocol that allows for an improved hand-in performance from a given PLMN to the UMA. These enhancements result in less dropped calls and provides for better hand-out performance from UMA to PLMN, as there is no reliance on uncontrolled handset algorithms, and no reliance on quality of service (QoS) event packages. Additionally, the proffered architecture may also offer better handling of channel modification requests, which also enhances performance.

For purposes of teaching and discussion, it is useful to provide some overview as to the way in which the following invention operates in an UMAN environment. The following foundational information may be viewed as a basis from which the present invention may be properly explained. Such information is offered earnestly for purposes of explanation only and, accordingly, should not be construed in any way to limit the broad scope of the present invention and its potential applications.

UMA technology enables access to GSM and GPRS mobile services over unlicensed spectrum, including Bluetooth, WiFi, etc. UMA Technology offers: 1) seamless delivery of mobile voice and data services over unlicensed wireless networks; 2) the same mobile identity on cellular RAN and unlicensed wireless networks; 3) seamless transitions (roaming and handover) between cellular RAN and unlicensed wireless networks; 4) independent of underlying unlicensed spectrum technology (e.g. WiFi, Bluetooth); 5) transparency for existing standard CPE devices (e.g. access points, routers and modems); 6) standard "always on" broadband IP access networks (e.g. DSL, Cable, T1/E1, Broadband Wireless, FTTH, etc.); 7) security equivalent to current GSM mobile networks; and 8) no impact to operations of cellular RAN (e.g. spectrum engineering, cell planning, etc.).

UMA technology provides alternative access to GSM and GPRS core network services via IP-based broadband connections. In order to deliver a seamless user experience, the specifications define a new network element (the UMA network controller (UNC)) and associated protocols that provide for the secure transport of GSM/GPRS signaling and user plane traffic over IP. The UNC interfaces into the core network via existing 3GPP specified A/Gb interfaces.

Note that a centralized access controller (CAC) is a more generic form of the UNC. For purposes of clarity, the UNC is detailed in a number of examples included herein. However, the CAC should be construed as performing the same outlined operations. Moreover, the CAC is not bound to UMA technology, as it may readily be applicable to other system architectures.

Referring back now to FIG. 1, mobile station 12 is associated with an end user, a client, or a customer wishing to initiate a communication session or a data flow in communication system 10 via IP network 20. Mobile station 12 can conduct two types of communications, which implicate cellular RAN 16 and UMAN 18. Mobile station 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. Mobile station 12 may also be inclusive of a suitable interface to the human user, such as a microphone, an earpiece, a display, a keyboard, or other terminal equipment (such as for example an interface to a personal computer or to a facsimile machine in cases where mobile station 12 is used as a modem). In one specific non-limiting embodiment, mobile station 12 is a UMA-enabled dual-mode handset capable of operating in several types of networks.

Mobile station 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 16 is a communications interface between mobile station 12 and another network node(s) (e.g. a Mobile Switching Center (MSC) or serving GPRS support node (SGSN), which is not shown in FIG. 1 for purposes of simplification). RAN 16 may comprise a base transceiver station and a base station controller. The communications interface provided by RAN 16 offers connectivity and allows data to be exchanged between mobile station 12 and any number of selected elements within communication system 10. RAN 16 facilitates the delivery of a communication generated by mobile station 12 and the reception a communication sought by mobile station 12. RAN 16 is only one example of a communications interface between mobile station 12 and an MSC or SGSN. Other types of communications interfaces may be used for a desired network design based on particular needs.

Cellular network 14 represents communications equipment, including hardware and any appropriate controlling logic, for providing wireless telephony services using cellular protocols and technology. Various cellular protocols and technologies may be used by cellular network 14, including but not limited to GSM, time division multiple access (TDMA), code division multiple access (CDMA), and any other appropriate analog or digital cellular protocol or technology. Furthermore, cellular network 14 may utilize signaling system 7 (SS7) protocol for signaling purposes. Cellular network 14 may be coupled to any number of base stations, as well as base station controllers, mobile switching centers, and other appropriate communications equipment for use in communicating with mobile station 12. Thus, as illustrated, cellular network 14 may couple to a base station controller to receive and transmit wireless signals to and from mobile station 12.

IP network 20 represents a series of points or nodes of interconnected communication paths for receiving and transmitting packets of information that propagate through communication system 10. IP network 20 offers a communicative interface between mobile station 12 and an access gateway (e.g. a gateway GPRS support node (GGSN)) and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

Wireless network 28 is a wireless protocol that allows mobile station 12 to connect to a local network through a wireless or a radio connection. Such a protocol may be generally based on the IEEE 802.11 standard, Bluetooth, or on any other suitable architecture that provides for wireless communications in a network environment. Wireless network 28 as referred to herein in this document may also be representative of a 'hot spot' or a public WLAN (PWLAN) where appropriate. Wireless network 28 may be deployed in residential areas or alternatively in such public places as coffee shops, airports, restaurants, hotels, and conference centers, for example, as a way to provide connectivity to mobile station 12.

Wireless network 28 may be coupled to each of the devices used a given end user, such as mobile station 12 for example. Wireless network 28 may also be coupled to IP network 20 and facilitate authentication procedures for mobile station 12 by communicating with IP network 20. Suitable encryption protocols may be included within a protocol associated with wireless network 28 where appropriate and according to particular needs.

Wireless network 28 may be inclusive of an access point and an access router or gateway operable to facilitate communication sessions, including authentication protocols in designated locations. The access router or gateway may aggregate access points within a corresponding hot spot. It may also provide a back haul from the public hot spot location to the corresponding core network whether that core network is reflected by a broker's network or an operator's network.

In operation of an example flow associated with FIG. 1, consider a case where a mobile subscriber with a UMA-enabled, dual-mode handset moves within range of an unlicensed wireless network to which the handset is allowed to connect. Upon connecting, the handset contacts the UMA UNC over the broadband IP access network to be authenticated and authorized to access GSM voice and GPRS data services via the unlicensed wireless network. If authorized, the dual mode client receives cell and location area identification information. The dual mode client will then compare this location area information with that previously received from the cellular network and if the two are different, perform a location update procedure using the UMAN, whereby the subscriber's current location information stored in the core network is updated, and from that point, on, all requests to establish a mobile voice and data traffic session is routed to the handset via the UMAN, rather than the cellular RAN.

In the case of handover, the UMA-enabled subscriber with an already established voice or data session will compare the cell information received from the UNC with the neighbor cell information received from the cellular network. If there is a match between the equivalent UMA cell and a cell in the neighbor list, the dual mode client will begin reporting the UMA cell in its measurement reports to the cellular network with elevated signal strength. Using established handover techniques, this will trigger a handover from the RAN to the UMAN.

In the case when a UMA-enabled subscriber moves outside the range of an unlicensed wireless network to which he is connected, the UNC and handset facilitate roaming and handover back to the licensed outdoor network. This process is completely transparent to the subscriber. In the case of handover, if a subscriber is on an active GSM voice call or GPRS data session when they come out of range of an unlicensed wireless network, that voice call or data session can automatically handover between access networks with no discernable service interruption.

It should be noted that the internal structure of FIG. 1 is malleable and can be readily changed, modified, rearranged, or reconfigured in order to achieve its intended operations. FIG. 1 offers only one possible architecture, which has been used for purposes of teaching only. Software and/or hardware may reside in mobile station 12, MWG 32, configuration server 34, and/or the UMA UNC (or the CAC) in order to achieve the teachings of the enhanced handover feature of the present invention. In one example embodiment, this enhanced handover function may be facilitated by software provided in one, some, or all of these identified elements. However, due to their flexibility, these elements (i.e. mobile station 12, MWG 32, configuration server 34, and/or the UMA UNC [or the CAC]) may alternatively be equipped with (or include or be coupled to) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of these elements included within communication system 10 and, accordingly, it should be construed as such.

Figure 2:
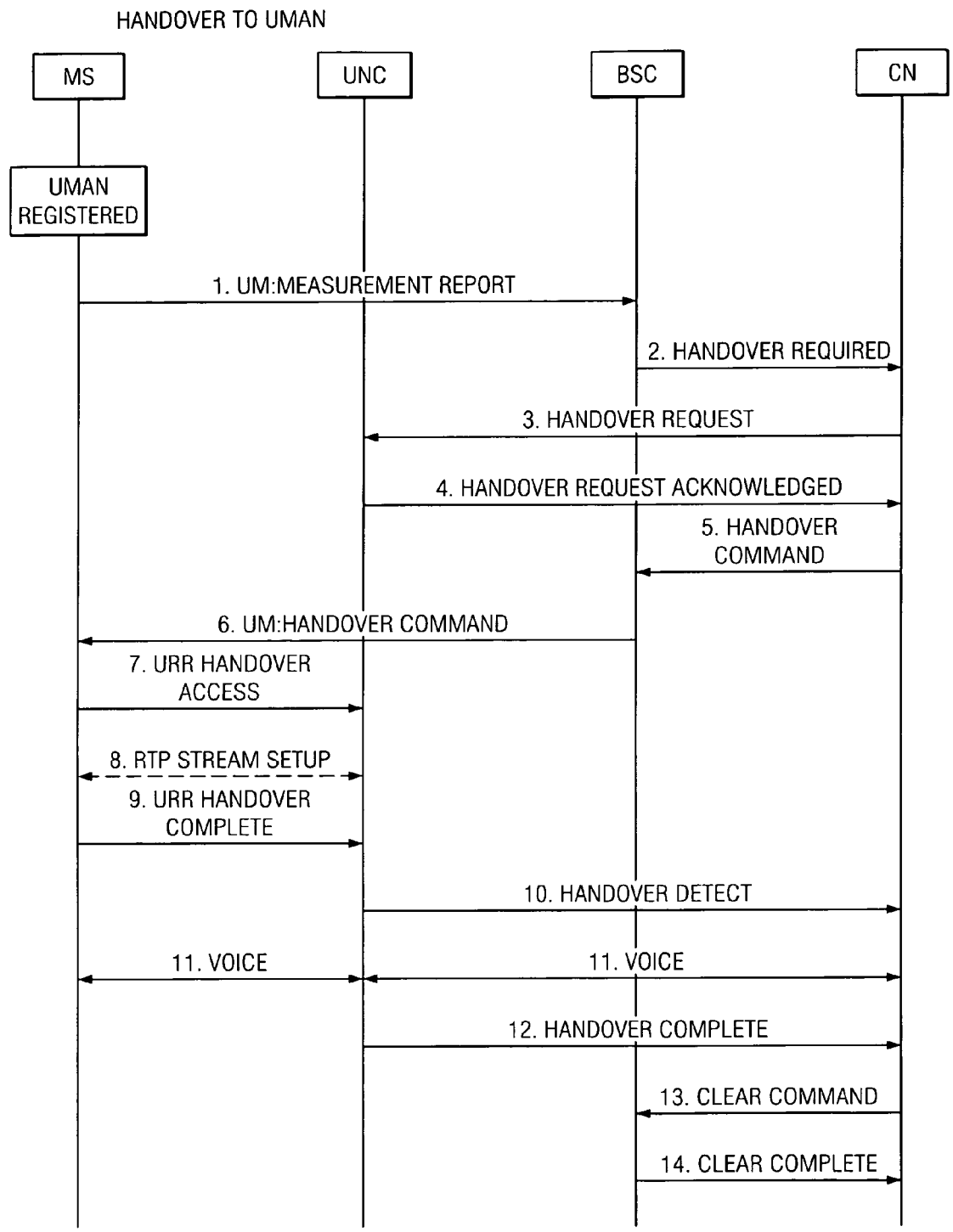
FIG. 2 is a simplified flow diagram illustrating an example operational flow of a handover scenario.

FIG. 2 is a simplified flow diagram illustrating an example operational flow of a handover scenario involving UMA technology. In this example, mobile station 12 has detected UMA coverage and successfully registered on UMAN 18, allowing mobile station 12 to obtain system information relating to the UMAN cell. Further, the GERAN/UTRAN provides information on the neighboring cells such that one of the {ARFCN, BSIC} in the neighbor list matches the {ARFCN, BSIC} associated with the UMAN cell.

Referring now to the steps of FIG. 2, at step 1 mobile station 12 now begins to include UMA cell information in the Measurement Report to the GERAN. Mobile station 12 reports the highest signal level for the UMA cell {ARFCN, BSIC}. At step 2, based on mobile station 12 measurement reports and other vendor specific BSS algorithms, GERAN decides to handover to the UMA cell using an internal mapping of {ARFCN, BSIC} to CGI. The GERAN starts the handover preparation by sending a handover required message to the core network (CN), identifying the target (UMAN) cell. At step 3, the CN requests the target UNC to allocate resources for the handover using a Handover Request. At step 4, the target UNC acknowledges the handover request using Handover Request Acknowledge (indicating it can support the requested handover) and provides a Handover Command that indicates the radio channel to which the mobile station should be directed.

At step 5, the CN forwards the Handover Command to the GERAN, thereby completing the handover preparation. At step six GERAN sends Handover Command to mobile station 12 to initiate handover to UMAN. The Handover Command includes (among other parameters) information about the target UMAN such as BCCH ARFCN, PLMN color code, and BSIC. Mobile station 12 does not switch its audio path from GERAN to UMAN until handover completion, i.e., until it sends the URR HANDOVER COMPLETE, to keep the audio interruption short. At step seven mobile station 12 accesses the serving UNC using the URR HANDOVER ACCESS message, and provides the entire Handover Command received from GERAN. The handover reference in the handover command allows the serving UNC to correlate the handover to the Handover Request Acknowledge message (sent earlier to the CN) and to identify the successful completion of the handover.

At step eight the serving UNC sets up the bearer path with mobile station 12. At step nine mobile station 12 transmits the URR HANDOVER COMPLETE to indicate the completion of the handover procedure at its end. It switches the user from the GERAN user plane to the UMAN user plane. At step 10 the serving UNC indicates to the CN that it has detected mobile station 12, using Handover Detect message. The CN may now switch the user plane from the source GERAN to the target UMAN. At step 11 bi-directional voice traffic is now flowing between mobile station 12 and CN, via the serving UNC. At step 12, the target UNC indicates the handover is complete using the Handover Complete message. If not already done in step 10, the CN now switches the user plane from the source GERAN to the target UMAN. At step 13, the CN tears down the connection to the source GERAN (e.g. using a Clear Command). At step 14, the source GERAN confirms the release of GERAN resources allocated for this call.

Using the teachings of the present invention, there is an additional link between the residential gateway serving the UMA client and the UMA controller. This link is used to transfer quality related attributes, e.g., level of congestion, packet retransmission rates, etc. to the UNC. At stage 3 in the above described flow, the GSM network will send a handover request to the UNC. If the signaling link between the UNC and the residential gateway indicates that this handover will likely fail, e.g., due to a poor WLAN service or congested WAN link, then the UNC shall reply to the HANDOVER REQUEST with a HANDOVER FAILURE message with a cause of "requested terrestrial resources unavailable" (see GSM 08.08) in this particular example. Other scenarios may involve different messages being sent but that indicate the same.

This message will ensure that the user does not suffer degraded call quality due to a handover failure. The determination of whether the handover will fail can use WAN congestion, WLAN congestion, and other parameters together with the bandwidth of the requested channel to determine if the handover should be rejected by the UNC.

Furthermore, once successfully handed over to the UMA cell, the link to the residential gateway is used to enhance the triggering of the handover from the UMA cell back to the PLMN. In the up-link direction, the legacy UMA solution relies on two independent techniques depending on whether the user is in a circuit switched (CS) call or has a packet switched (PS) session. For a CS call, the UMA controller can use an H.248 event trigger to determine when/if the circuit switched call falls below one of a set of QoS thresholds. For PS calls, the UMA controller itself is provided with additional intelligence in order to infer quality measurements from the received up-link packets corresponding to the PS session. As outlined previously, the MGW is not normally required to perform QoS monitoring since this is normally relegated to the GSM RAN.

This event package may not be supported on a particular gateway, or where the gateway is shared for different purposes, the QoS thresholds may not be applicable to UMA usage. Since the up-link quality can be directly correlated with the congestion of the WAN interface of the residential gateway, another aspect of the invention relates to the publishing of the WAN congestion status by the residential gateway using the link between the residential gateway and UMA controller to provide the controller with such. The UMA can additionally use the reported WAN congestion status in determining when to trigger a handover due to up-link quality.

As has been highlighted, the mechanism for triggering a handover from UMA cell to the PLMN due to down-link quality has not been specified. This may lead to spurious behaviors and poor service levels as malfunctioning handsets mean that a UMA handset remains on UMA longer than is desirable. The same connection between residential gateway and UNC is used to provide information on the status of the down-link connection. This status can include metrics on WLAN throughput, retransmissions, jitter, buffer lengths, etc. On the basis on this information, the UMA controller is now able to deterministically trigger a handover due to down-link quality.

Finally, because the UMA controller has an insight into WAN and WLAN congestion, the UMA controller can use this information in handling requests for channel modification, e.g., the upgrading of a PS service from 8 kit/s to 50 kit/s may be rejected because indications show that this will lead to congestion on the WLAN or WAN links.

Figure 3:
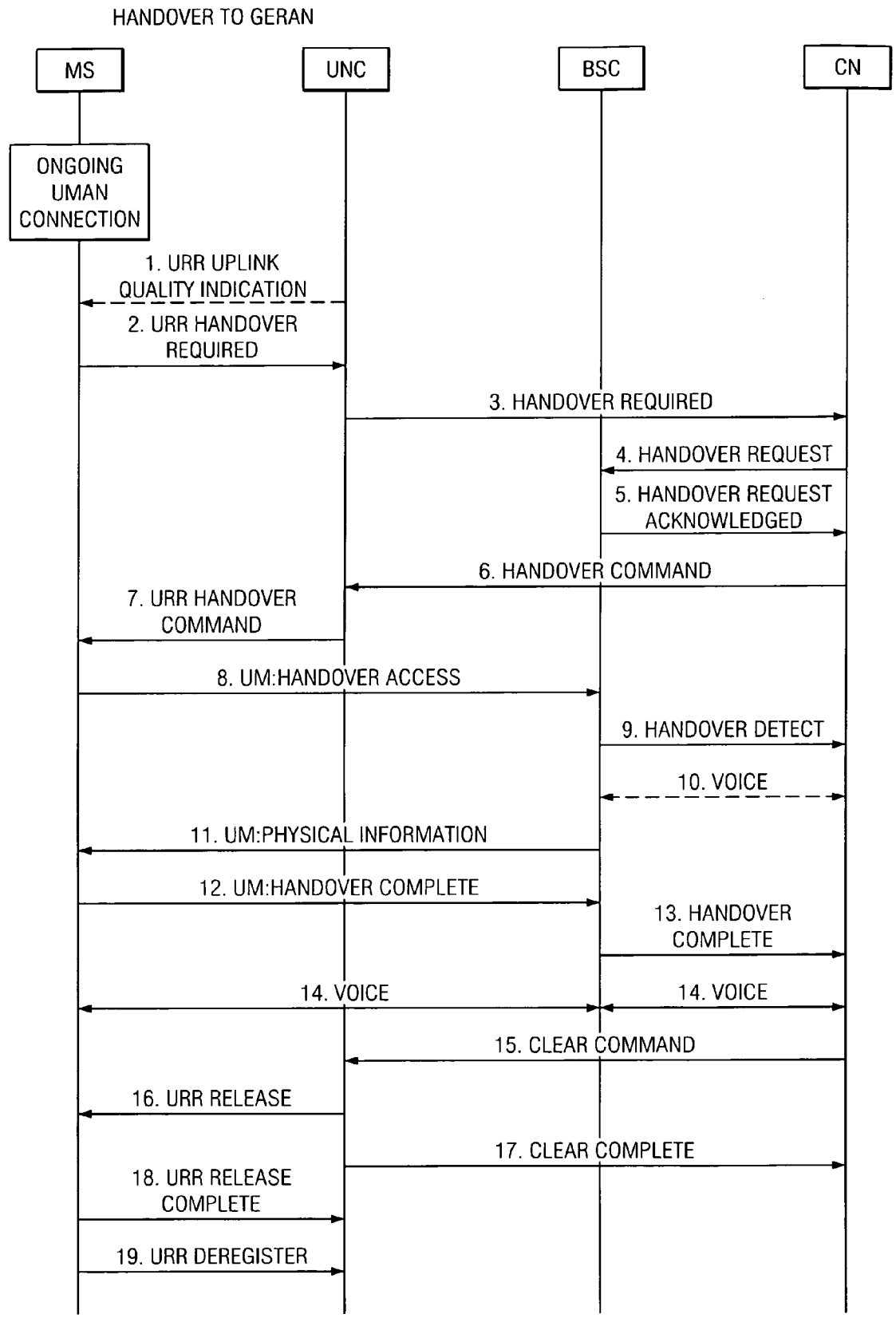
FIG. 3 is a simplified block diagram illustrating another example operational flow of a handover scenario associated with the communication system of FIG. 1.

FIG. 3 is a simplified block diagram of another example operational flow of the communication system of FIG. 1. The scenario can readily utilize the teachings of the present invention as outlined herein. The following sequence assumes that mobile station 12 is on an active call on the UMAN and the following conditions and mode selection preferences apply: a) mobile station 12 begins to leave UMA coverage, based on its local measurements of UMA coverage signal quality as well as any uplink quality indications received form the UMAN; and b) for GERAN-preferred, a GSM PLMN becomes available. The handover from UMAN to GERAN procedure is triggered by mobile station 12, based on its local measurements of UMA coverage signal quality, as well as any uplink quality indications received form the UMAN.

Turning now to the steps of FIG. 3, at step 1 the UNC may send a URR UPLINK QUALITY INDICATION based on certain criterion. Mobile station 12 sends the URR HANDOVER REQUIRED message to the serving UNC indicating the channel mode and a list of target GERAN cells, identified by CGI, in order of preference (e.g. ranked by C1 path loss parameter) for handover, and includes the received signal strength for each identified GERAN cell. This list is the most recent information obtained from the GSM RR sub-layer and could have been stored before GSM RR entered hibernation mode. In addition, the URR HANDOVER REQUIRED message may indicate a list of target UTRAN cells ranked in order of preference for handover.

At step 3, if the serving UNC selects a target GERAN cell, the handover to GERAN procedure is performed. The serving UNC then starts the handover preparation by signaling to the CN the need for handover, using Handover Required and including the GERAN cell list provided by the MS. The UNC may include only a subset of the cell list provided by mobile station 12. At step 4 the CN selects a target GERAN cell and requests it to allocate the necessary resources, using Handover Request. At step 5 the target GERAN builds a Handover Command message providing information on the channel allocated and sends it to the CN through the Handover Request Acknowledge message. At step 6 the CN signals the Serving UNC to handover the MS to the GERAN, using Handover Command message, ending the handover preparation phase. At step 7 the Serving UNC transmits the URR HANDOVER COMMAND to mobile station 12 including the details sent by the GERAN on the target resource allocation. At step 8 mobile station 12 transmits the GERAN Handover Access command containing the handover reference element to allow the target GERAN to correlate this handover access with the Handover Command message transmitted earlier to the CN in response to the Handover Required. At step 9 the target GERAN confirms the detection of the handover to the CN, using the Handover Detect message. At step 10 the CN may at this point switch the user plane to the target BSS.

At step 11 the GERAN provides Physical Information to mobile station 12 (i.e. Timing Advance, to allow the MS to synchronize with the GERAN). At step 12 mobile station 12 signals to the GERAN that the handover is completed, using Handover Complete. At step 13 the GERAN confirms to the CN the completion of the handover, via Handover Complete message. If the user plane has not been switched in step 10, the CN switches the user plane to the target BSS. At step 14 bi-directional voice traffic is now flowing between the MS and CN, via the GERAN. At step 15 on receiving the confirmation of the completion of the handover, the CN indicates to the Serving UNC to release any resources allocated to the MS, via the Clear Command. At step 16 the serving UNC commands the MS to release resources, using the URR RR RELEASE message. At step 17 the serving UNC confirms resource release to CN using the Clear Complete message. Finally, at step 18, mobile station 12 confirms resource release to the Serving UNC using the URR RR RELEASE COMPLETE message. At step 19 mobile station 12 may finally deregister from the Serving UNC, using URR DEREGISTER message.

Using the teachings of the present invention, there is an additional link between the residential gateway serving the UMA client and the UMA controller. This link is used to transfer quality related attributes, e.g., level of congestion, packet retransmission rates, etc. to the UNC. At stage 1 in the above described flow, if the signaling link between the UNC and the residential gateway indicates that the user's voice or packet data session is suffering degraded quality, e.g., due to a poor WLAN service or congested WAN link, then the UNC shall trigger the sending of the URR Uplink Quality Indicator message to trigger the handover from UMAN to GERAN.

It is important to note that the stages and steps in FIGS. 2 through 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered considerably. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing enhanced handover functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of the wireless network could easily be replaced by a virtual private network (VPN), a metropolitan area network (MAN), a wide area network (WAN), or any other element that facilitates data propagation for mobile station 12. Using analogous reasoning, the gateways and servers illustrated by FIG. 1 may be supplanted by routers, switches bridges, hubs, or any other suitable devices that are conducive to network communications. As used herein in this document, all of these terms are interchangeable such that reference to a 'gateway' or to a 'server' encompasses all such permutations, which are clearly within the broad scope of the present invention.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for assisting in a handover, comprising:
    an Unlicensed Mobile Access (UMA) centralized access controller (CAC) coupled to customer premises equipment (CPE) by a signaling link, the CAC operable to:
        facilitate a communication session involving a mobile station;
        receive a request for a handover from a Global System for Mobile (GSM) public network to a UMA cell controlled by the CAC;
        receive one or more quality related attributes from the CPE over the signaling link;
        recognize from the one or more quality related attributes that sufficient resources are unavailable for supporting the handover from the GSM public network to the UMA cell; and
        reject the request.

2. The apparatus of claim 1, wherein the handover from the CAC to the public network can be triggered by poor downlink quality without leveraging algorithms associated with the mobile station.

3. The apparatus of claim 1, wherein channel modification requests for enhanced service may be rejected by the CAC because information provided by the CPE indicates that such an enhancement will lead to a deterioration in quality for the communication session.

4. The apparatus of claim 1, wherein communications between the CAC and the CPE are achieved via a configuration server.

5. The apparatus of claim 4, wherein the configuration server supports communications complaint with DSL-forum TR-069.

6. The apparatus of claim 1, wherein the CAC is operable to reply to with a handover failure message.

7. The apparatus of claim 6, wherein the handover failure message ensures that the mobile station does not suffer degraded call quality due to a handover failure.

8. The apparatus of claim 1, wherein once successfully handed over to a cell controlled by the CAC, the link to the CPE is used to enhance triggering of the handover from the cell controlled by the CAC back to the public network.

9. The apparatus of claim 1, wherein the CPE is operable to publish congestion status using the link.

10. The apparatus of claim 9, wherein the CAC can use the published congestion status in determining when to trigger a handover due to up-link quality.

11. The apparatus of claim 1, wherein the link may be used to provide information on a status of a down-link connection such that the CAC is able to deterministically trigger a handover due to down-link quality.

12. The apparatus of claim 1, wherein the channel is associated with a circuit switched (CS) call or a packet switched (PS) call.

13. The apparatus of claim 1, wherein the resources are associated with a wide area network (WAN) or a wireless network.

14. The apparatus of claim 1, wherein in an up-link direction, and for a circuit switched (CS) call, the CAC can use an event trigger to determine when or if the CS call falls below one of a set of quality of service (QoS) thresholds.

15. The apparatus of claim 1, wherein in an up-link direction, and for packet switched (PS) calls, the UNC is operable to infer quality measurements from received up-link packets corresponding to the PS call.

16. The apparatus of claim 1, wherein a cell controlled by the CAC corresponds to unlicensed radio technology.

17. The apparatus of claim 16, wherein the centralized access controller is a unlicensed mobile access (UMA) network controller (UNC).

18. A method for assisting in a handover, comprising:
    facilitating, by an Unlicensed Mobile Access (UMA) centralized access controller (CAC), a communication session involving a mobile station, the CAC coupled to customer premises equipment (CPE) by a signaling link;
    receiving a request for a handover from a Global System for Mobile (GSM) public network to a UMA cell controlled by the CAC;
    receiving one or more quality related attributes from the CPE over the signaling link;
    recognizing from the one or more quality related attributes that sufficient resources are unavailable for supporting the handover from the GSM public network to the UMA cell; and
    rejecting the request.

19. The method of claim 18, wherein the handover from the CAC to the public network can be triggered by poor downlink quality.

20. The method of claim 18, wherein channel modification requests for enhanced service may be rejected because information provided by the CPE indicates that such an enhancement will lead to a deterioration in quality for the communication session.

21. The method of claim 18, wherein communications between the CAC and the CPE are achieved via a configuration server.

22. The method of claim 18, further comprising:
    replying to the request with a handover failure message indicating that the handover will likely fail.

23. The method of claim 18, wherein once successfully handed over to a cell controlled by the CAC, the link to the CPE is used to enhance triggering of the handover from the cell controlled by the CAC back to the public network.

24. The method of claim 18, further comprising:
    publishing congestion status using the link.

25. Software for assisting in a handover, the software being embodied in a computer readable medium and comprising computer code, such that when executed, is operable to:
    facilitate, by an Unlicensed Mobile Access (UMA) centralized access controller (CAC), a communication session involving a mobile station, the CAC coupled to customer premises equipment (CPE) by a signaling link;
    receive a request for a handover from a Global System for Mobile (GSM) public network to a UMA cell controlled by the CAC;
    receive one or more quality related attributes from the CPE over the signaling link;
    recognize from the one or more quality related attributes that sufficient resources are unavailable for supporting the handover from the GSM public network to the UMA cell; and
    reject the request.

26. The medium of claim 25, wherein the handover from the CAC to the public network can be triggered by poor downlink quality.

27. The medium of claim 25, wherein channel modification requests for enhanced service may be rejected because information provided by the CPE indicates that such an enhancement will lead to a deterioration in quality for the communication session.

28. The medium of claim 25, wherein the code is further operable to:
reply to the request with a handover failure message indicating that the handover will likely fail.

29. The medium of claim 25, wherein the code is further operable to:
publish congestion status using the link.

30. A system for assisting in a handover, comprising:
means for facilitating, by an Unlicensed Mobile Access (UMA) centralized access controller (CAC), a communication session involving a mobile station, the CAC coupled to customer premises equipment (CPE) by a signaling link;
means for receiving a request for a handover from a Global System for Mobile (GSM) public network to a UMA cell controlled by the CAC;
means for receiving one of more quality related attributes from the CPE over the signaling link;
means for recognizing from the one or more quality related attributes that sufficient resources are unavailable for supporting the handover from the GSM public network to the UMA cell; and
means for rejecting the request.

31. The system of claim 30, wherein the handover from the CAC to the public network can be triggered by poor downlink quality.

32. The system of claim 30, wherein channel modification requests for enhanced service may be rejected because information provided by the CPE indicates that such an enhancement will lead to a deterioration in quality for the communication session.

33. The system of claim 30, further comprising:
means for replying to the request with a handover failure message indicating that the handover will likely fail.

34. The system of claim 30, wherein once successfully handed over to a cell controlled by the CAC, the link to the CPE is used to enhance triggering of the handover from the cell controlled by the CAC back to the public network.

35. The system of claim 30, further comprising:
means for publishing congestion status using the link.

\* \* \* \* \*

UNITED STATES PATENT AND TRADEMARK OFFICE
CERTIFICATE OF CORRECTION

PATENT NO.      : 7,657,262 B2                                                   Page 1 of 1
APPLICATION NO. : 11/136686
DATED           : February 2, 2010
INVENTOR(S)     : Mark Grayson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this

Thirtieth Day of November, 2010

David J. Kappos
*Director of the United States Patent and Trademark Office*